United States Patent
Hsu et al.

(10) Patent No.: US 8,208,087 B2
(45) Date of Patent: Jun. 26, 2012

(54) THIN FILM TRANSISTOR ARRAY SUBSTRATE AND REPAIR METHOD

(75) Inventors: Han-Tung Hsu, Taoyuan County (TW); Hui-Chung Shen, Taipei County (TW); Ssu-Tsung Wu, Taoyuan County (TW); Wen-Sheng Liu, Taoyuan County (TW); Ya-Jung Kung, Pingtung County (TW); Ching-Yun Ko, Taichung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 655 days.

(21) Appl. No.: 12/389,372

(22) Filed: Feb. 20, 2009

(65) Prior Publication Data

US 2009/0153764 A1 Jun. 18, 2009

Related U.S. Application Data

(63) Continuation-in-part of application No. 11/163,851, filed on Nov. 1, 2005, now Pat. No. 7,522,248.

(51) Int. Cl.
*G02F 1/1333* (2006.01)
*G02F 1/1343* (2006.01)
*G02F 1/1345* (2006.01)

(52) U.S. Cl. .......... 349/55; 349/54; 349/141; 349/149; 349/150; 349/152; 257/59

(58) Field of Classification Search .......... 349/55, 349/54, 141, 149–152; 257/59
See application file for complete search history.

(56) References Cited

U.S. PATENT DOCUMENTS

| | | | | |
|---|---|---|---|---|
| 7,358,534 | B2 * | 4/2008 | Park | 257/72 |
| 7,936,410 | B2 * | 5/2011 | Oh et al. | 349/54 |
| 8,045,084 | B2 * | 10/2011 | Baek et al. | 349/54 |
| 2001/0026345 | A1 * | 10/2001 | Park et al. | 349/149 |
| 2006/0050219 | A1 * | 3/2006 | Lee | 349/141 |
| 2006/0077313 | A1 * | 4/2006 | Liu et al. | 349/55 |
| 2008/0174713 | A1 * | 7/2008 | Cheng et al. | 349/54 |
| 2010/0026923 | A1 * | 2/2010 | Chen et al. | 349/55 |

* cited by examiner

*Primary Examiner* — Huyen Ngo
(74) *Attorney, Agent, or Firm* — Jianq Chyun IP Office (57) ABSTRACT

A TFT array substrate comprising a substrate has a pixel region and a peripheral circuit region surrounding the pixel region, a TFT array, first lead lines, second lead lines, and first repair patterns is provided. The peripheral circuit region has an outer area and an inner area. The inner area is disposed between the pixel region and the outer area. The TFT array disposed in the pixel region includes a first conducting layer and a second conducting layer. The first lead lines and the second lead lines disposed in the peripheral circuit region are on the same layer of the first conducting layer and the second conducting layer respectively. The first repair patterns disposed in the inner area are sandwiched between the second lead lines and the substrate. At least a first pre-repair area is at a region where the second lead lines and the first repair patterns are overlapped.

2 Claims, 12 Drawing Sheets

THIN FILM TRANSISTOR ARRAY SUBSTRATE AND REPAIR METHOD

CROSS-REFERENCE TO RELATED APPLICATION

This application is a continuation-in-part of U.S. application Ser. No. 11/163,851, filed on Nov. 1, 2005, now allowed. The entirety of the above-mentioned patent application is hereby incorporated by reference herein and made a part of this specification.

BACKGROUND OF THE INVENTION

1. Field of the Invention

The present invention generally relates to an array substrate and a repair method, in particular, to a thin film transistor (TFT) array substrate and a repair method.

2. Description of Related Art

In recent years, with great advance in the fabricating technique of electrical-optical and semiconductor devices, flat panel displays (FPDs), such as liquid crystal displays (LCDs), have been developed. Due to the merits of LCDs, for example, low operation voltage, no harmful radiation, light weight, and compact size, LCDs replace the conventional Cathode Ray Tube (CRT) monitors and become the mainstream.

Figure 1:
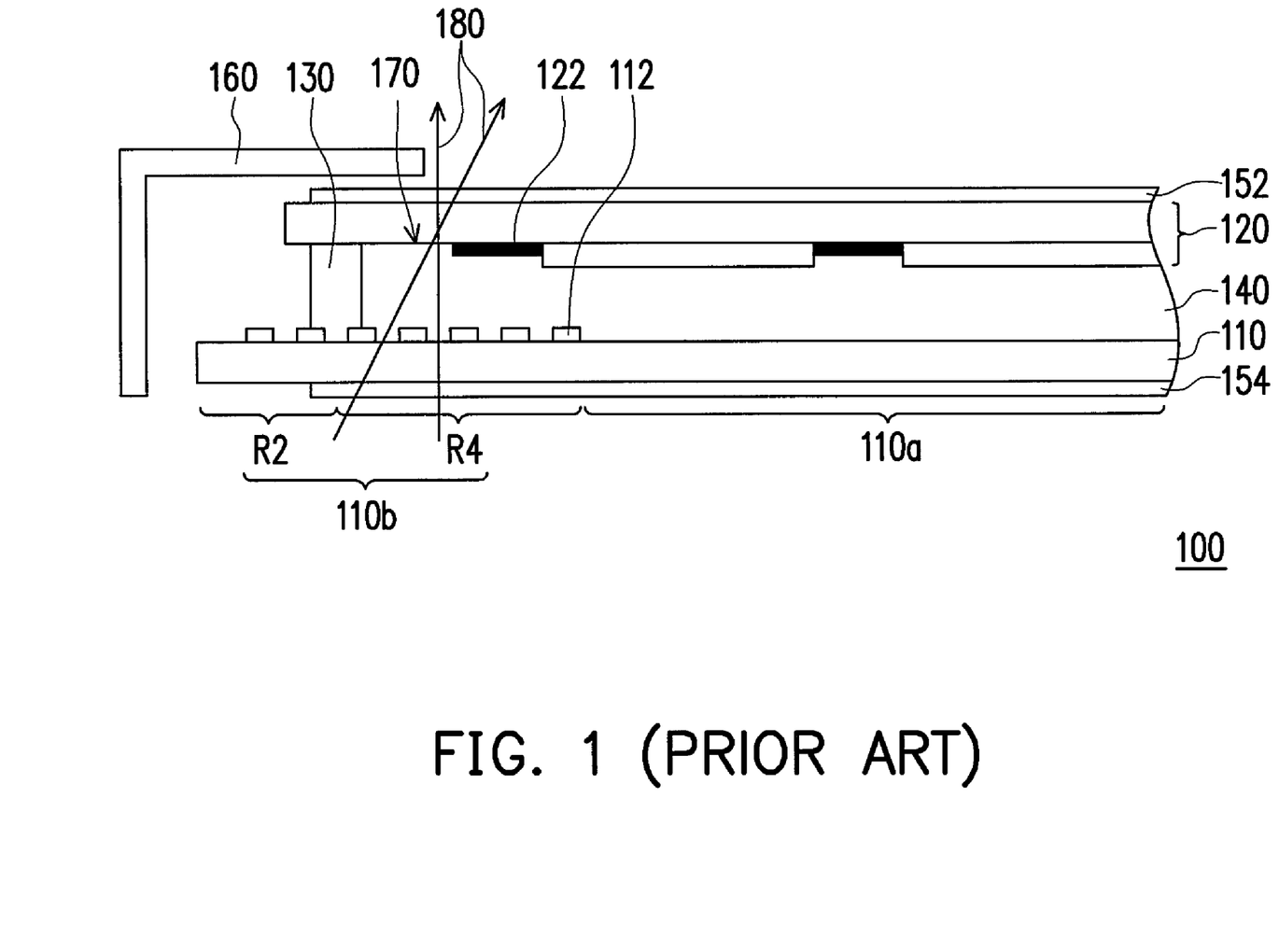
FIG. 1 is a simplified cross-sectional view of a conventional liquid crystal display module.

FIG. 1 is a simplified cross-sectional view of a conventional liquid crystal display module. Referring to FIG. 1, the liquid crystal display module 100 comprises a thin film transistor (TFT) array substrate 110, a color filter substrate 120, a sealant 130, a liquid crystal layer 140, polarizing films 152, 154 and an outer frame 160. The sealant 130 is disposed between the color filter substrate 120 and the thin film transistor array substrate 110. The liquid crystal layer 140 is disposed within the space bounded by the color filter substrate 120, the thin film transistor array substrate 110 and the sealant 130. Furthermore, the polarizing films 154, 152 are disposed on other sides of the thin film transistor array substrate 110 and the color filter substrate 120, respectively. The outer frame 160 is disposed on the polarizing film 152. In addition, the thin film transistor array substrate 110 can be divided into a pixel region 110a and a peripheral circuit region 110b, wherein the peripheral circuit region 110b can be divided into an outer area R2 and an inner area R4. The peripheral circuit region 110b has a plurality of lead lines 112 therein for connecting pixels in the pixel region 110a and peripheral circuits for driving the pixels in the pixel region 110a.

Each of the lead lines 112 is apt to control a row of pixels. If any defect is generated in the lead lines 112 during the fabricating process, the pixels connecting to the lead lines 112 can not display images normally. A displaying image of the liquid crystal display module 100 may show an extraordinary bright line. Specifically, after the color filter substrate 120 and the thin film transistor array substrate 110 are assembled, the defect of the lead lines 112 is further difficult to be repaired. Therefore, the displaying quality of the liquid crystal display module 100 can not be improved.

Besides, in a one drop filling (ODF) process for forming the liquid crystal layer 140, if the sealant 130 is non-uniformly radiated by ultraviolet, the incompletely hardened sealant 130 may contaminate the liquid crystal in the liquid crystal layer 140. For this reason, the black matrix layer 122 on the color filter substrate 120 is slightly shrunk towards the center of the module. However, because of the slight shrink of the black matrix layer 122, an area 170 with light of leakage is formed between the black matrix layer 122 and the sealant 130, wherein the area is corresponding to the inner area R4. In addition, there is no shield between the lead lines 112 within the inner area R4. Hence, light 180 emitted from a back light module may pass through the gaps between the lead lines 112, and light-leakage occurs at the junction between the outer frame 160 and the thin film transistor array substrate 110.

Therefore, in a prior solution, a shield layer, made of a first metal layer (M1) and a second metal layer (M2), is between the lead lines. However, in case of particle contamination or static discharge, shorts occur at the overlap of the shield layer and the metal layer (M1 or M2). If so, a corresponding row of pixels is called a "bright line", and the module is not qualified.

SUMMARY OF THE INVENTION

The present invention is directed to a thin film transistor (TFT) array substrate, for improving the yields and the quality, and preventing the occurrence of light-leakage.

The present invention is further directed to a repair method, for repairing a TFT array substrate and improving the yields.

The present invention provides a TFT array substrate which comprises a substrate, a TFT array, a plurality of first lead lines, a plurality of second lead lines, and a plurality of first repair patterns. The substrate has a pixel region and a peripheral circuit region surrounding the pixel region. The peripheral circuit region has an outer area and an inner area, and the inner area is disposed between the pixel region and the outer area. The TFT array is disposed in the pixel region. The TFT array includes a first conducting layer and a second conducting layer. The first lead lines are disposed in the peripheral circuit region, and the first lead lines are on the same layer of the first conducting layer. The second lead lines are also disposed in the peripheral circuit region, and the second lead lines are on the same layer of the second conducting layer. The first repair patterns are disposed in the inner area, wherein the first repair patterns are sandwiched between the second lead lines and the substrate, and at least a first pre-repair area is at a region where the second lead lines and the first repair patterns are overlapped.

According to an embodiment of the present invention, the number of the first repair patterns is substantially equal to the number of the second lead lines, and each of the first repair patterns is disposed under one of the second lead lines.

According to an embodiment of the present invention, the number of the first repair patterns is substantially more than the number of the second lead lines, and more than two of the first repair patterns are disposed under one of the second lead lines. Further, the first repair patterns may be staggered-arranged on the substrate.

According to an embodiment of the present invention, the number of the first repair patterns is substantially less than the number of the second lead line, and the first repair patterns are disposed under a number of the second lead lines. In addition, the TFT array substrate further comprises a plurality of first repair connecting patterns, connecting the first repair patterns.

According to an embodiment of the present invention, the TFT array substrate further comprises a plurality of second repair patterns disposed in the inner area. The first lead lines are substantially sandwiched between the second repair patterns and the substrate, and at least a second pre-repair area is at a region where the first lead lines and the second repair patterns are overlapped. The number of the second repair patterns may be substantially equal to the number of the first lead line, and each of the second repair patterns is disposed under one of the first lead lines. Additionally, the number of the second repair patterns is substantially more than the number of the first lead line, and more than two of the second repair patterns are disposed under one of the first lead lines. When the number of the second repair patterns is substantially more than the number of the first lead line, the second repair patterns may be staggered-arranged on the substrate. Further, the number of the second repair patterns can also be substantially less than the number of the first lead line, and the second repair patterns may be disposed under a number of the first lead lines. When the number of the second repair patterns is substantially less than the number of the first lead line, the TFT array substrate further comprises a plurality of second repair connecting patterns connecting the second repair patterns.

According to an embodiment of the present invention, the TFT array substrate further comprises a plurality of first shield lines and a first connection line. The first shielding lines are exemplifying disposed in the inner area, the first shield lines are between and overlapped with the second lead lines for preventing lights pass through gaps between the second lead lines. The first connection line is electrically connected to the first shield lines. The first shield lines and the first connection line may be on the same layer of the first conducting layer, wherein connections parts of the first shield lines to the first connection line have widths smaller than distances between the second lead lines. Each of the first shield lines, for example, has side parts overlapped with adjacent second lead lines. Besides, The TFT array substrate further comprises a plurality of second shield lines and a second connection line. The second shield lines are disposed in the inner area, and are between and overlapped with the first lead lines for preventing lights pass through gaps between the first lead lines. The second connection line is electrically connected to the second shield lines. The second shield lines and the second connection line may be on the same layer of the second conducting layer, wherein connections parts of the second shield lines to the second connection line have smaller widths than distances between the first lead lines. Each of the second shield line has side parts overlapped with adjacent first lead lines.

A repair method is further provided. First, a TFT array substrate as the TFT array substrate described in the above-mentioned embodiments is provided, wherein the TFT array substrate has at least a defect on least one of the second lead lines. Then, the second lead line in which the defect is existed thereon is cut, such that the two parts of the second lead line besides the defect are electrically isolated. Further, the second lead line and the first repair pattern thereunder are welded through the first pre-repair area, such that the two parts of the second lead line are electrically connected with the first repair pattern.

According to an embodiment of the present invention, the method of cutting the second lead line is laser cutting process.

According to an embodiment of the present invention, the TFT array substrate further comprises a plurality of first repair connecting patterns, and the first repair cutting patterns are further cut such that the welded first repair pattern is electrically isolated from the other first repair patterns.

A repair method is advanced provided. First, a TFT array substrate as the TFT array substrate described in the above-mentioned embodiments is provided, wherein the TFT array substrate has at least a defect on least one of the first lead lines. The first lead line having the defect thereon is cut, such that the two parts of the first lead line besides the defect are electrically isolated. The first lead line and the second repair pattern thereabove are welded through the second pre-repair area such that the two parts of the first lead line are electrically connected with the second repair pattern.

According to an embodiment of the present invention, the method of cutting the first lead line is laser cutting process.

According to an embodiment of the present invention, the TFT array substrate further comprises a plurality of second repair connecting patterns, and the second repair cutting patterns are further cutting, such that the welded second repair pattern is electrically isolated from the other second repair patterns.

As above, the repair patterns of the TFT array substrate in the present invention are disposed corresponding to the first lead lines and the second lead lines. If any defect generated during the manufacturing process of the TFT array substrate, the first lead lines and the second lead lines can be repaired by these repair patterns. Therefore, the yield rate of the TFT array substrate is high and the LCD having the TFT array substrate of the present invention has good displaying quality. Further, the shielding lines in the TFT array substrate are further conducive to improving the displaying contrast of the LCD having the same.

In order to the make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
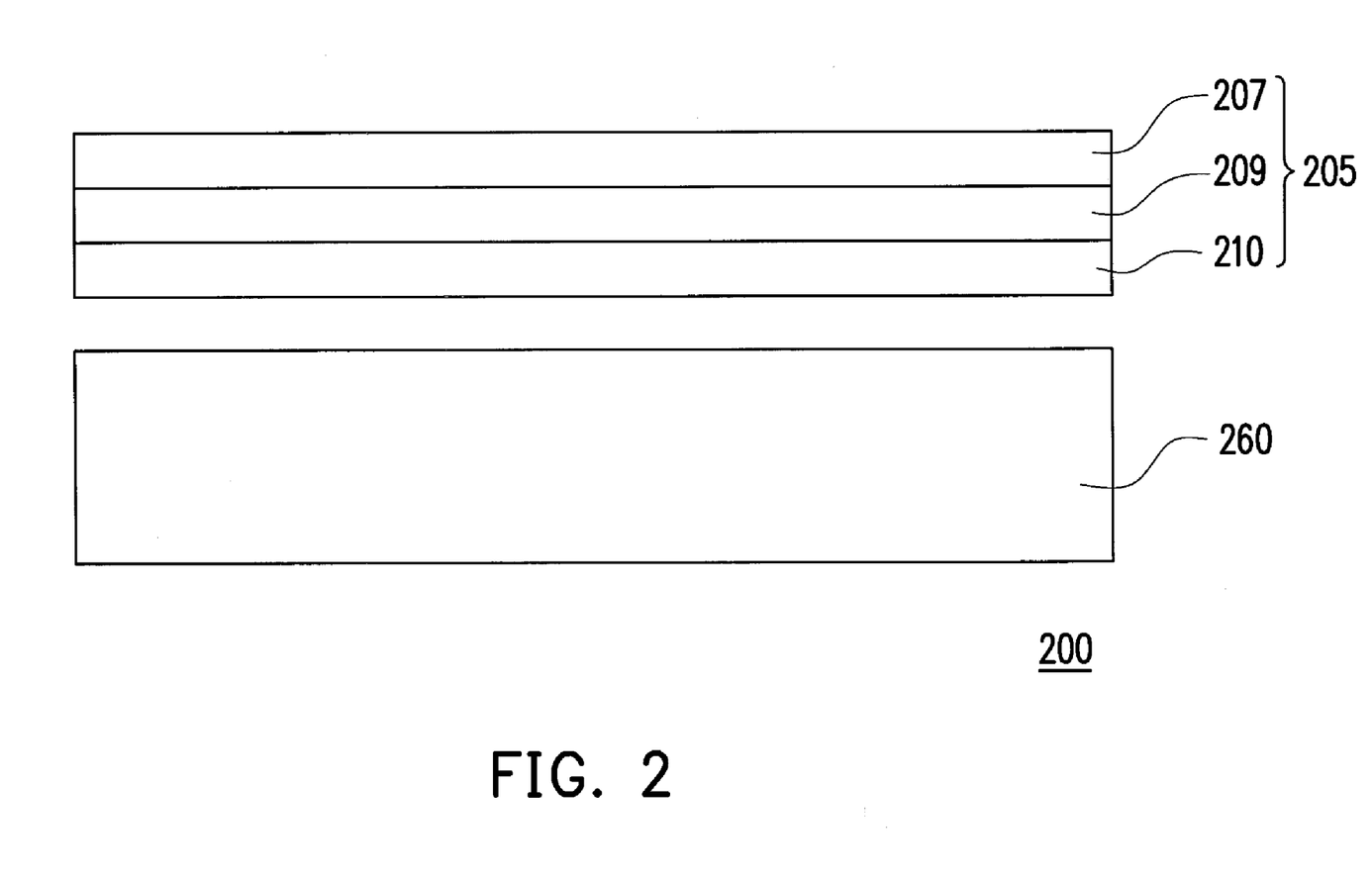
FIG. 2 shows a cross-sectional view of a liquid crystal display (LCD) module according to an embodiment of the invention.

FIG. 2 shows a cross-sectional view of a liquid crystal display (LCD) module according to an embodiment of the invention. Referring to FIG. 2, a LCD module 200 includes an LCD panel 205 having a thin film transistor (TFT) array substrate 210, an opposite substrate 207, a liquid crystal layer 209 and a back-light module 260. The TFT array substrate 210 is detailed described later. The liquid layer 209 is between the opposite substrate 207 and the TFT array substrate 210.

In this embodiment, the opposite substrate 207 is, for example, a color filter substrate. The back-light module 260 is disposed besides the TFT array substrate 210, for emitting light to the LCD panel 205. Now, the detail explanation of the TFT array substrate 210 is as follows.

Figure 3:
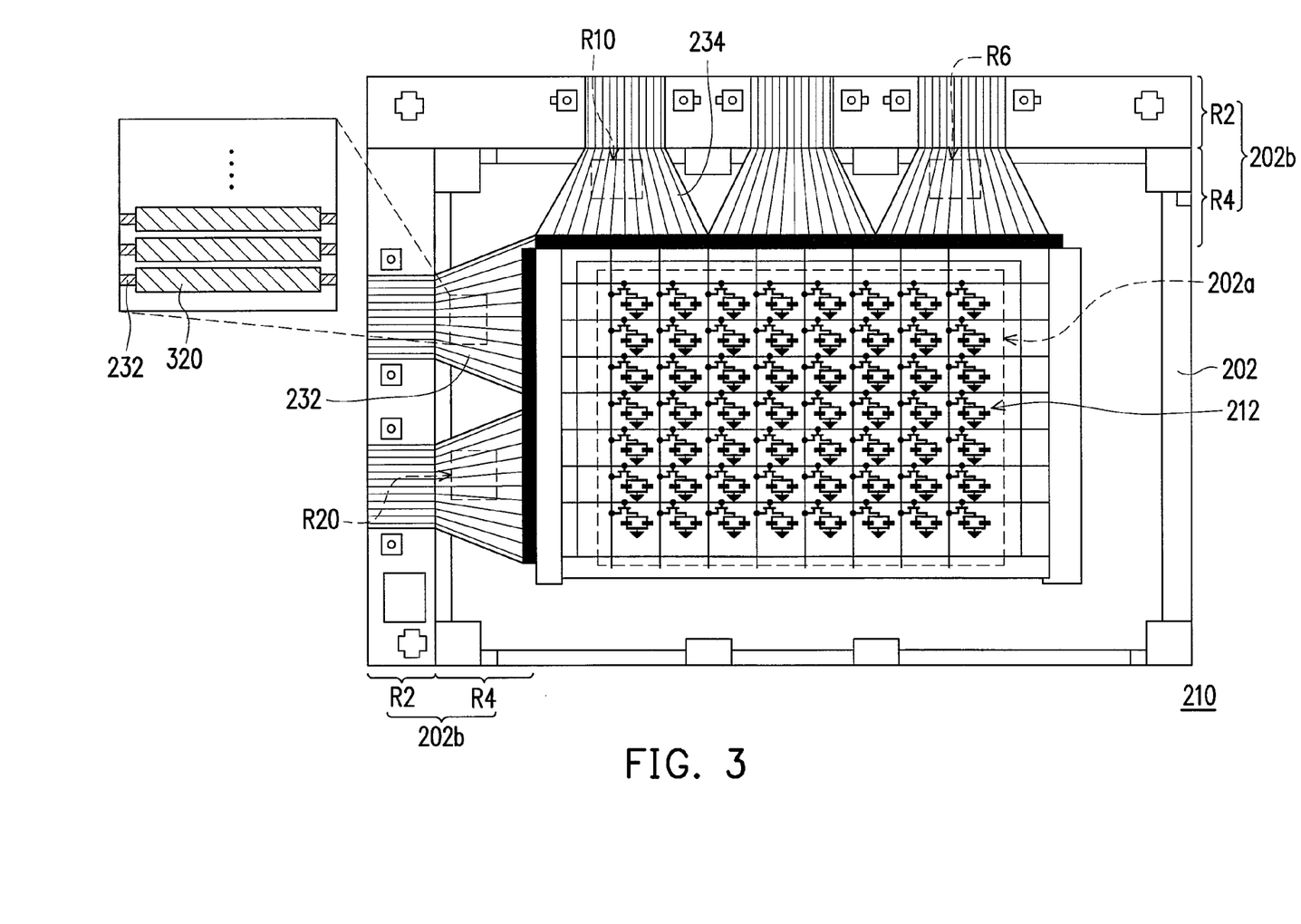
FIG. 3 shows a top view of the thin film transistor array substrate of LCD according to FIG. 2.
Figure 4A:
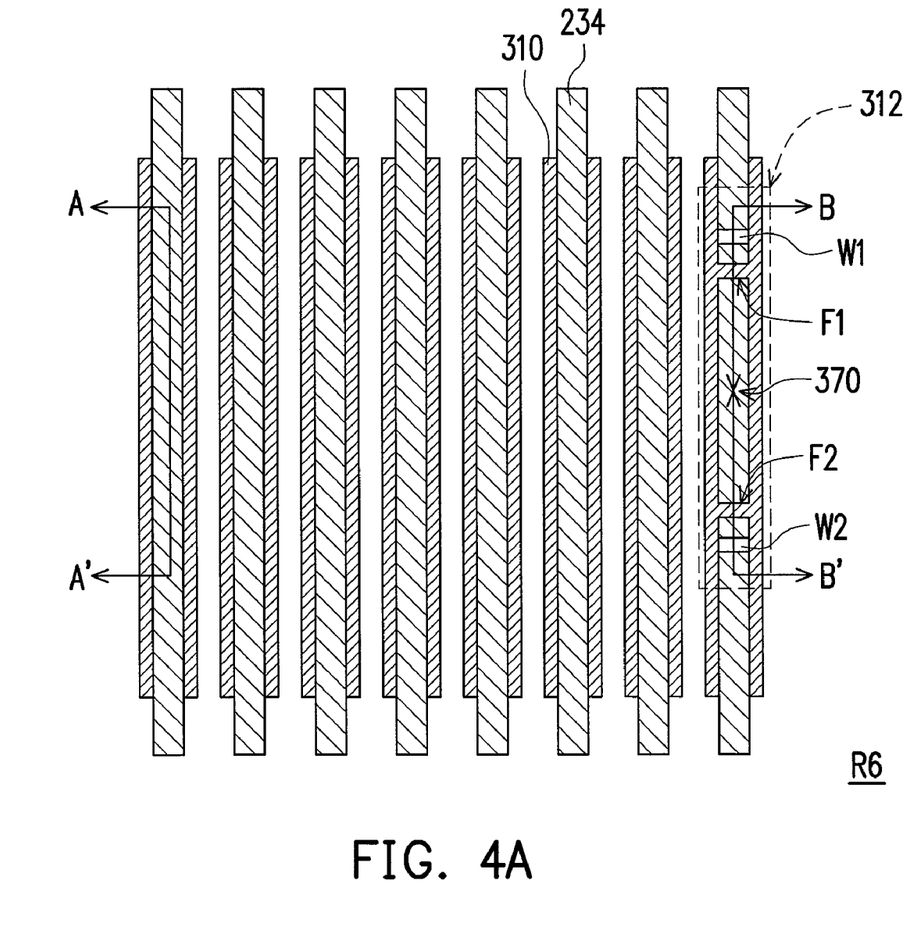
FIG. 4A shows an enlargement of one embodiment of a part R6 in an inner area R4 in FIG. 3.

FIG. 3 shows a top view of the thin film transistor array substrate of LCD according to FIG. 2. FIG. 4A shows an enlargement of one embodiment of a part R6 in an inner area R4 in FIG. 3. Please referring to FIG. 3 and FIG. 4A, the TFT array substrate 210 includes a substrate 202, a TFT array 212, a plurality of first lead lines 232 (for example, gate lines), a plurality of second lead lines 234 (for example, source lines), a plurality of first repair patterns 310, and a plurality of second repair patterns 320. The substrate 202 includes a pixel region 202a and a peripheral circuit region 202b surrounding the pixel region 202a. The peripheral circuit region 202b has an outer area R2 and an inner area R4. The inner area R4 is between the pixel region 202a and the outer area R2. The TFT array 212, formed of multiple TFTs and the pixel electrodes (not shown), are disposed on the pixel region 202a. The first and second lead lines 232 and 234 are disposed on the peripheral circuit region 202b. The first and second repair patterns 310 and 320 are disposed in the inner area R4. The TFT array 212 is for controlling arrangements of the liquid crystal layer 209 in FIG. 2.

The TFT array 212 is formed of a first metal or first conducting layer (M1 layer) and a second metal or second conducting layer (M2 layer). In the embodiment, the first lead (gate) lines 232 are formed of the first metal and the second lead (source) lines 234 are formed of the second metal. The first repair patterns 310 are sandwiched between the second lead lines 234 and the substrate 202. That is, the first repair patterns 310 are form of the first metal. In addition, at least a first pre-repair area 312 is at a region where the second lead lines 234 and the first repair patterns 310 are overlapped.

Figure 4B:
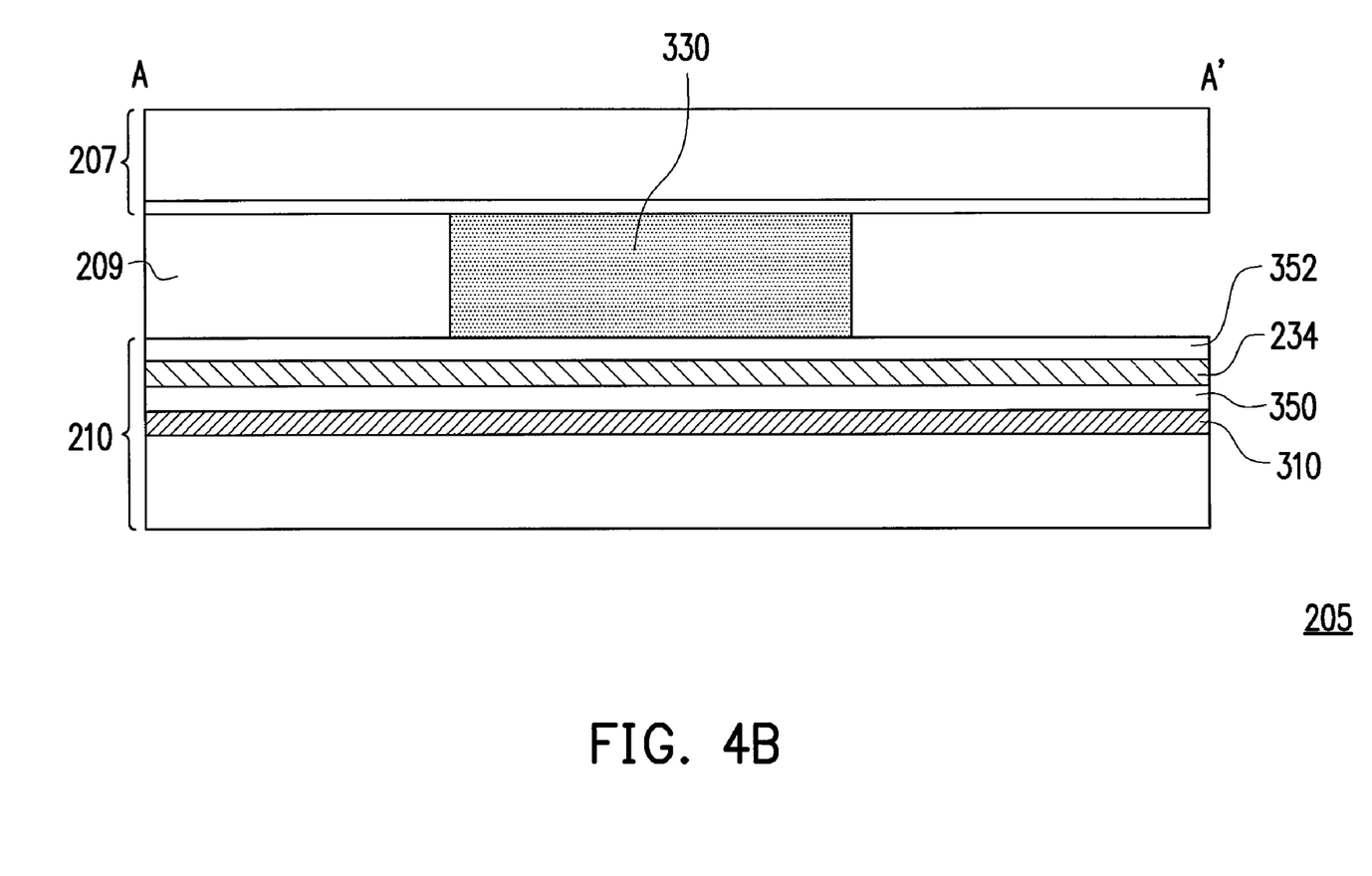
FIG. 4B shows the cross-section view of a part R6 in FIG. 4A along the line AA'.
Figure 4C:
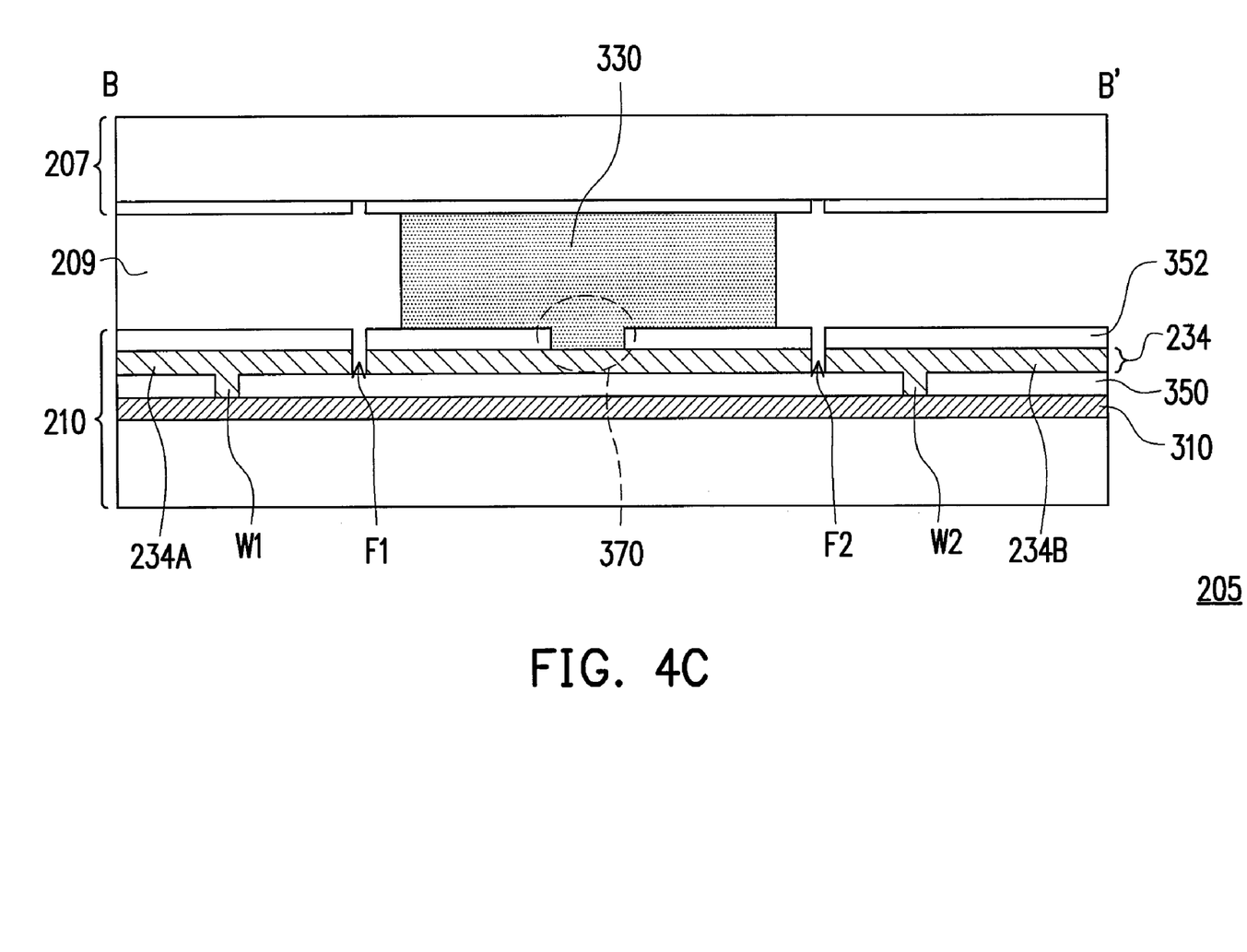
FIG. 4C shows the cross-section view of a part R6 in FIG. 4A along the line BB'.

FIG. 4B and FIG. 4C show the cross-section view of a part R6 in FIG. 4A along the line AA' and the line BB'. As shown in FIG. 4B and FIG. 4C, the TFT array substrate 210 and an opposite substrate 207 are assembled, and a liquid crystal layer 209 is formed therebetween. In addition, the TFT substrate 210 and the opposite substrate 207 are jointed by a sealant 330. The first repair patterns 310 and the second lead lines 234 are overlapped and isolated by an insulated layer 350. The second lead lines 234 are further covered by a passivation layer 352.

Referring FIG. 4C, during the manufacturing process of the LCD panel 205, a defect 370 may occur in the passivation layer 352 and/or the second lead lines 234. Herein, the defect 370 occurred in the passivation layer 352 is exemplified. The second lead line 234 may be exposed by the defect 370, and the second lead line 234 and other conductive element (for example, the electrode disposed on the opposite substrate 207) maybe short through the defect 370. According to another embodiment, the defect may be happened on the second lead line 234 which is open-circuit on the second lead line 234. Under the effect of the defect 370, the TFTs connect the second lead line 234 can not be operated properly. That is, a bright line or a dark line may be displayed on the LCD panel 205 because of the defect 370. In the present embodiment, the first repair patterns 310 disposed under one of the second lead lines 234 can be used to eliminating the effect of the defect 370, and thus the second lead line 234 would be repaired and can work normally.

Specifically, the repair method for repairing the second lead line 234 in the TFT array substrate 210 is described as followed. Referring to FIG. 4A and FIG. 4C, the TFT array substrate 210 has the defect 370 on the second lead line 234. Herein, a pre-repair area 312 is at a region where the second lead line 234 and the first repair pattern 310 are overlapped, and the defect 370 is substantially an opening in the passivation layer 352. First, the second lead line 234 having the defect 370 thereon is cut such that the two parts (234A and 234B) of the second lead line 234 besides the defect 370 are electrically isolated. In order to prevent the second lead line 234 from electrically connecting to other conductive element through the defect 370, the part of the second lead line 234 where the defect 370 is existed has to be electrically isolated from other parts of the second lead line 234. Therefore, the part of the second lead line 234 where the defect 370 must be cutting-off. In an embodiment, the method for cutting the second lead line 234 is a laser cutting process. The second lead line 234 is then broken because the fracture F1 and F2 located at the two side of the defect 370 are formed.

Next, the second lead line 234 and the first repair pattern 310 thereunder are welded through the first pre-repair area 312 such that the two parts 234A and 234B of the second lead line 234 are electrically connected with the first repair pattern 310. Two welding points W1 and W2 are formed for connecting the two parts 234A and 234B of the second lead line 234 and the first repair pattern 310. Since the formation of the welding points W1 and W2, the signal input into the part 234A can be transmitted to another part 234B through the welding point W1, the repair pattern 310 and the welding point W2 successively. In other word, the signal can be successively transmitted on the second lead lines 234 after the repairing process. Accordingly, the LCD panel 205 having the TFT array substrate 210 still has good displaying quality. Furthermore, the repairing method can also be performed after the TFT array substrate 210 and the opposite substrate 207 are assembled so as to eliminate any defect generated during the assembling process.

Figure 4D:
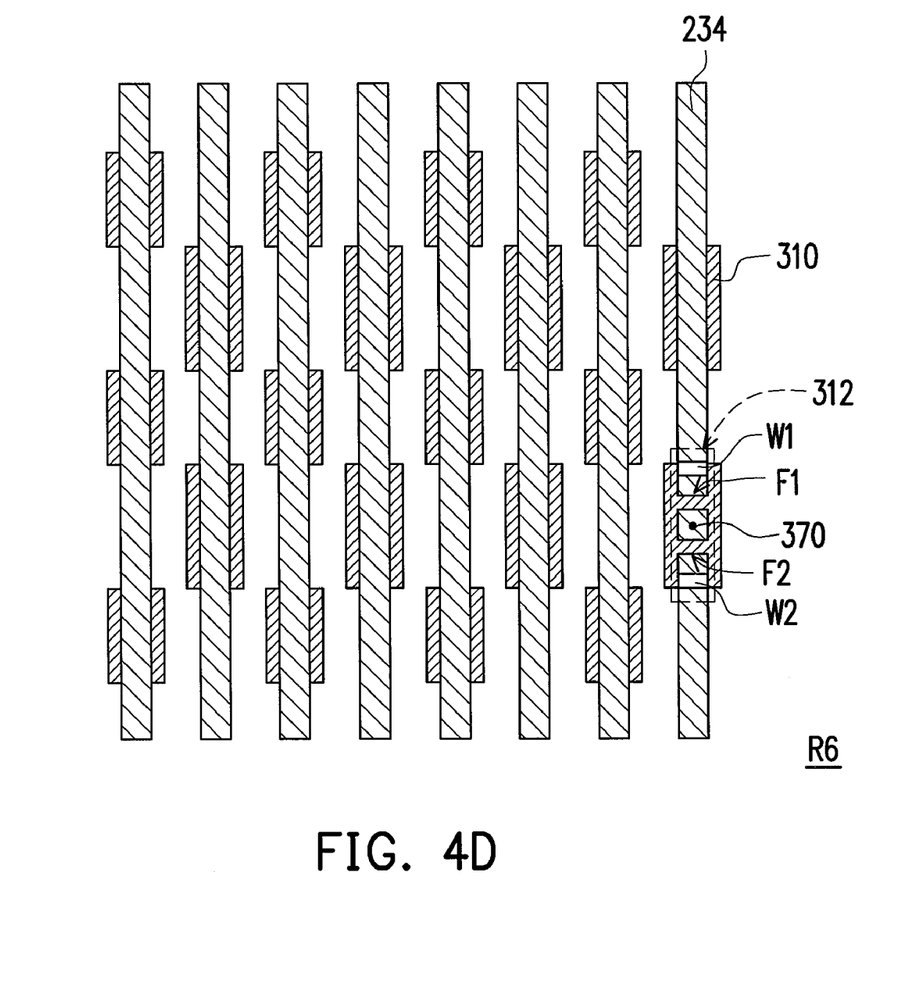
FIG. 4D shows an enlargement of other embodiment of a part R6 in FIG. 3.
Figure 4E:
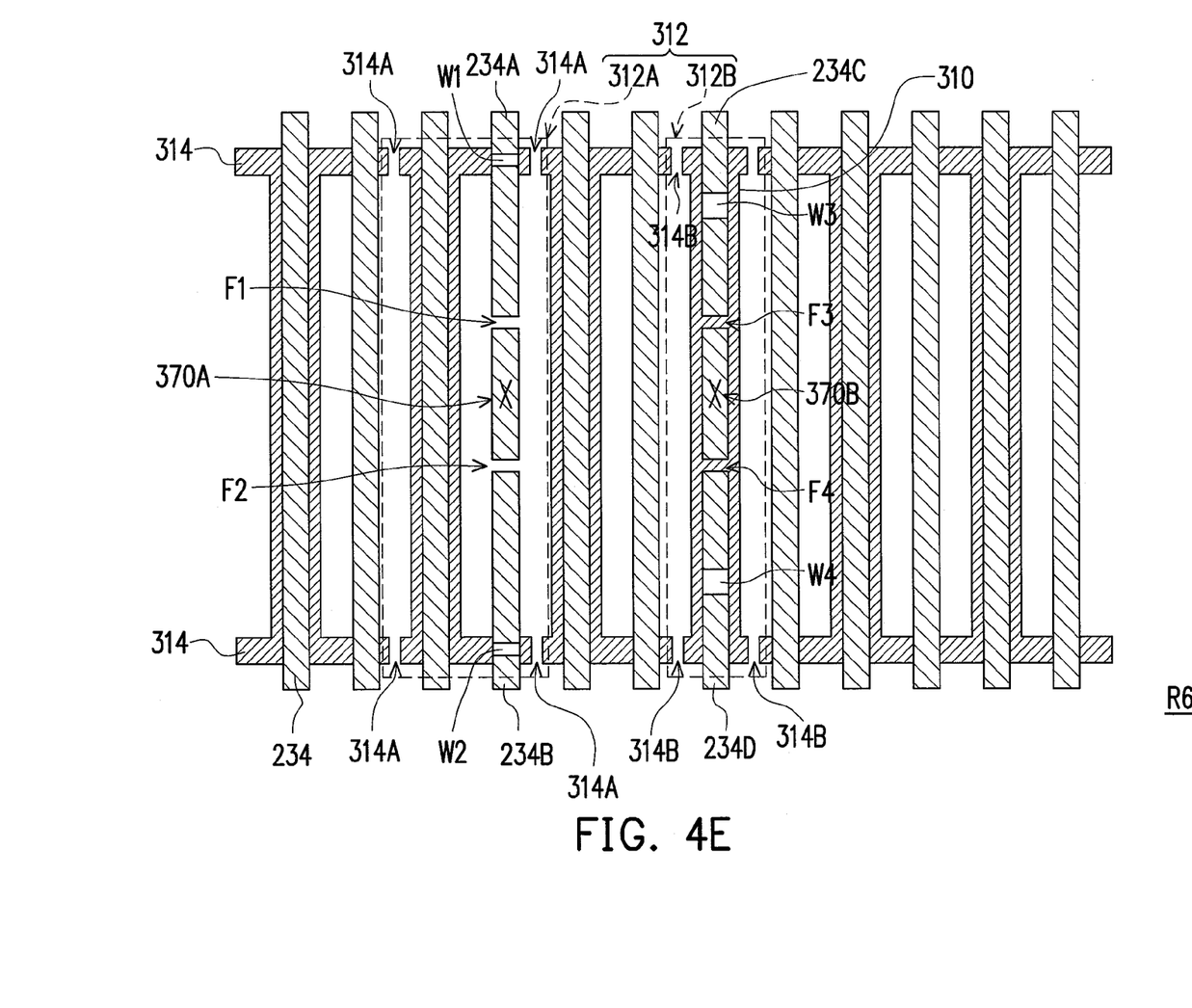
FIG. 4E show an enlargement of other embodiment of a part R6 in FIG. 3.

In the embodiment as shown in FIG. 4A, the number of the first repair patterns 310 is equal to the number of the second lead lines 234. However, in the present invention, the number of the first repair patterns 310 is not limited to be equal to the number of the second lead lines 234. The number of the first repair patterns 310 can further be more than or less than the number of the second lead lines 234, as shown in FIGS. 4D and 4E. FIG. 4D and FIG. 4E show enlargements of different embodiments of a part R6 in an inner area R4 in FIG. 3. Referring to FIG. 4D, the number of the first repair patterns 310 is substantially more than the number of the second lead lines 234, and more than two of the first repair patterns 310 are disposed under one of the second lead lines 234. In the present embodiment, the first repair patterns 310 are staggered-arranged on the substrate 202. That is, the first repair patterns 310 would not be overlapped mutually. Nevertheless, the first repair patterns 310 is overlapped with one of the second lead lines 234. The first repair patterns 310 and the second lead lines 234 are overlapped substantially in a pre-repair area 312. Any defect 370 exists on the second lead lines 234 can be eliminated through performing a repair method in the pre-repair area 312.

Specifically, after performing the repair method, two fractures F1, F2 and two welding points W1, W2 are formed beside the defect 370. The fractures F1 and F2 are located between the welding points W1 and W2 such that the second lead line 234 keeps well property in transmitting signals. The LCD panel having the first repair patterns 310 designed as the above-mentioned has good quality and high yield rate.

Referring to FIG. 4E, the number of the first repair patterns 310 is substantially less than the number of the second lead lines 234, and the first repair patterns 310 are disposed under a number of the second lead lines 234. That is, the first repair patterns 310 can be disposed under every two second lead lines 234 or every three second lead lines 234, for example. Additionally, in the present embodiment, a plurality of first repair connecting patterns 314 is further disposed in the TFT array substrate 210 for connecting the first repair patterns 310. The first repair connecting patterns 314 are on the same layer of the first repair patterns 310, and are disposed on the two sides of the first repair patterns 310. The first repair patterns 310 and a portion of the first repair connecting patterns 314 are overlapped with the second lead lines 234 so as to providing at least a pre-repair area 312. Herein, two pre-repair areas 312A, 312B are marked.

Concretely, the first repair connecting patterns 314 and the first repair patterns 310 are used to repair the second lead lines 234 if a defect 370A or 370B occurred in part R6. The repair method performing in the pre-repair area 312A is, for example, cutting the second lead line 234 having the defect 370A thereon, such that the fracture F1 and the fracture F2 are formed and the two parts 234A, 234B beside the defect 370A are electrically isolated.

Then, the second lead line 234 and the first repair connecting patterns 314 are welded through the first pre-repair area 312A. The welding points W1 and W2 are formed and the fractures F1 and F2 are located between the welding points W1 and W2. Subsequently, the signal input into the part 234A can be transmitted to the part 234B through the first repair connecting pattern 314, the repair patterns 310 and another first repair connecting pattern 314. That is, the signal input into the part 234A can be transmitted into the part 234B without passing through the defect 370A.

Nevertheless, the first repair patterns 310 and the first repair connecting patterns 314 are electrically connected. The defect 370A, for example, occurred above other second lead line 234 may not be eliminated. Therefore, the first repair connecting patterns 314 are further cut, such that the first repair pattern 310 in the first pre-repair area 312A is electrically isolated from other first repair patterns 310. The first repair connecting patterns 314 are cut to form four openings 314A in the pre-repair area 312A. The openings 314A separate a part of the first repair connecting patterns 314 in the first repair area 312A from other parts thereof such that the signal input to the part 234A can be transmitted to the part 234B without through the parts of the first repair connecting pattern 314 out of the first pre-repair area 312A. Thus, the parts of the first repair connecting pattern 314 out of the first repair area 312A can be used to repair the second lead lines 234 where other defect, for example defect 370A, is existed.

Next, the defect 370B may cause the second lead line 234 in the first pre-repair area 312B disconnection or short with other conductive elements. Accordingly, the corresponding second lead line 234 has to be repaired so as to allow the signal input to the part 234C transmitting to the other part 234D properly. The repair method in the present embodiment is substantially similar to the repair method described above. In details, the first repair connecting patterns 314 are further cut in the first pre-repair area 312B. The openings 314B are formed for electrically isolated the part of the first repair connecting patterns 314 in the first pre-repair area 312B from those out of the first pre-repair area 312B. Thus, the openings 314B surround the welding points W3 and W4, and the fractures F3 and F4. After accomplishing the repair method, the signal input to the part 234C can be transmitted to the part 234D through the first repair pattern 310 thereunder.

Referring to FIG. 3 again, according to another embodiment, the TFT array substrate 210 further comprises a plurality of second repair patterns 320 disposed above the first lead lines 232. The number of the second repair patterns 320 is equally to the number of the first lead lines 232 in the present embodiment. In other embodiments, the number of the second repair patterns 320 can be more than or less than the number of the first lead lines 232, and the disposition of the second repair patterns 320 can be similar to the disposition of the first repair patterns 310 shown in FIGS. 4D and 4E. The second repair patterns 320 overlapped with the first lead lines 232 provide at least a repair area (not marked) for preventing the first lead lines 232 from disconnection or short by any defect. In a word, the first lead lines 232 and the second lead lines 234 in the TFT array substrate 210 can be repaired if defects generated. Therefore, the LCD using the TFT array substrate 210 has good displaying quality and high yield rate. More specifically, the repair method performing on the first lead lines 232 can be similar to the repair method performing on the second lead lines 234, wherein the cutting process and the welding process may be proceeding from the front or back side of the TFT array substrate 210.

Figure 5:
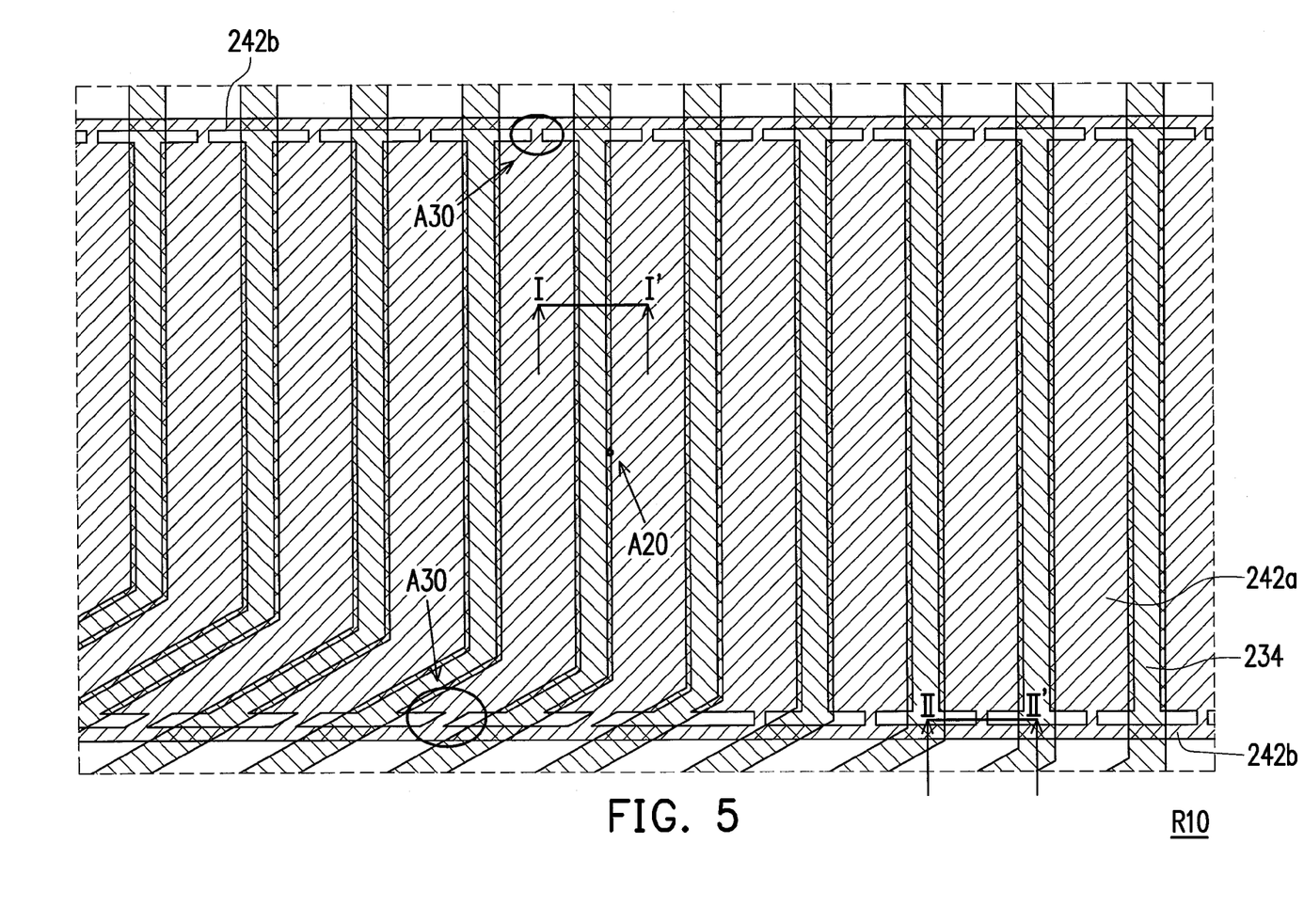
FIG. 5 shows an enlargement of an area R10 in FIG. 3.
Figure 6:
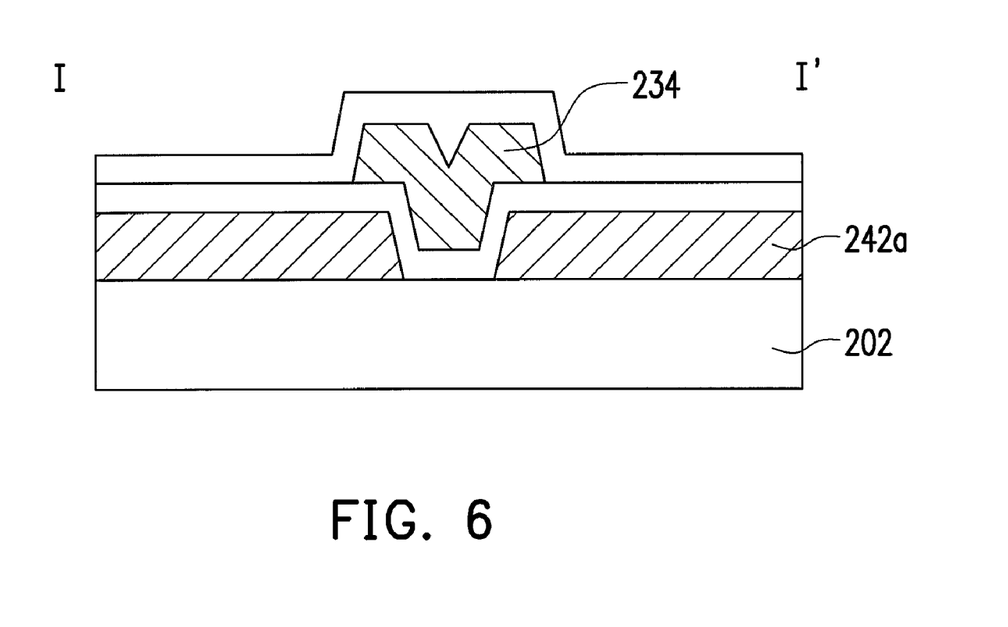
FIG. 6 and FIG. 7 show cross-sectional views taken along lines I-I' and II-II' of FIG. 5, respectively.
Figure 7:
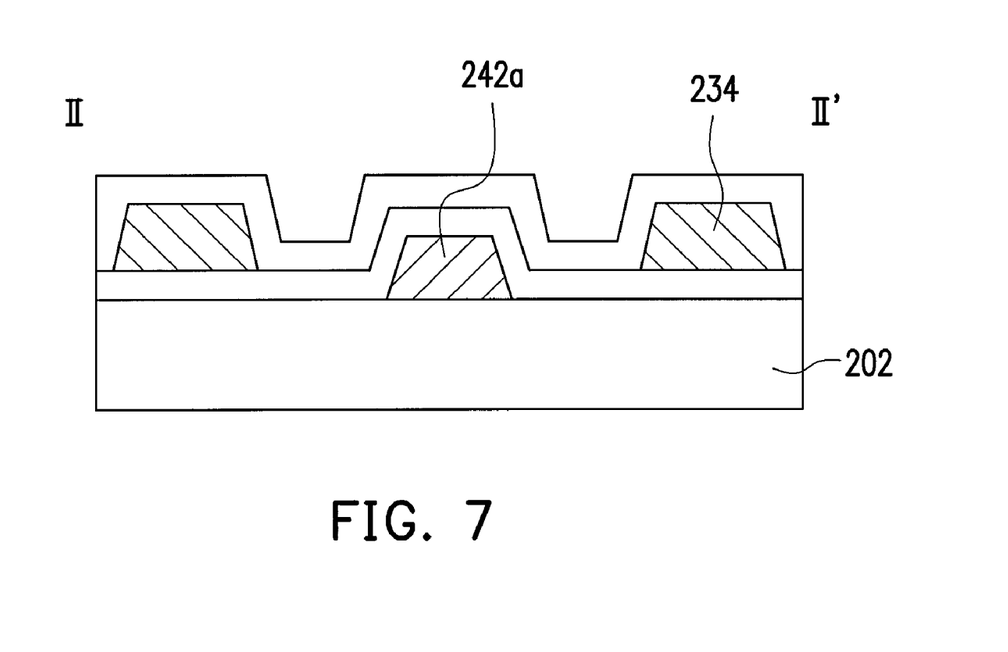

In addition to design repair patterns under the second lead lines or above the first lead lines in the inner area of the peripheral circuit region, shield lines are also formed in the inner area of the peripheral circuit region according to another embodiment of the present invention. FIG. 5 shows an enlargement of an area R10 in FIG. 3. FIG. 6 and FIG. 7 show cross-sectional views taken along lines I-I' and II-II' of FIG. 5, respectively. Referring to FIG. 5 and FIG. 6, for shielding light, each of the first shield lines 242a is disposed between two adjacent second lead lines (source lines) 234 for preventing light pass through the gaps between the source lines 234. For preventing leakage of light, sides of each shield line 242a are partially overlapped with the adjacent source lines 234. The terminals of the first shield line 242a are electrically connected to the first connection line 242b.

The first connection line 242b is coupled to a voltage source (not shown) for coupling a predetermined voltage to the first shield lines 242a, to prevent the signal interference between the source lines 234. This voltage provides an electrical inspection of the TFT array 212 for checking whether there are shorts between the source lines 234 and the first shield lines 242a.

If there is particle contamination or static discharge, i.e. defects, during manufacturing process, shorts may occur in the overlap, for example, pointed by an arrow A20 in FIG. 5, between the first shield lines 242a and the source lines 234. Connection parts of the first shield lines 242a to the first connection lines 242b have smaller widths than the gaps between adjacent source lines 234. In other words, connection parts of the first shield lines 242a are not overlapped with the source lines 234, as shown in FIG. 5 and FIG. 7. Even shorts occur between the first shield lines 242a and the source lines 234 because connection parts of the first shield lines 242a to the first connection lines 242b, marked by the arrow A30 in FIG. 5, are smaller and not overlapped with the source lines 234, the shorts are repaired by cutting off connection parts of the first shield lines 242a (marked by the arrow A30) by laser. By this, yield of the TFT array substrate 210 is improved.

Figure 8:
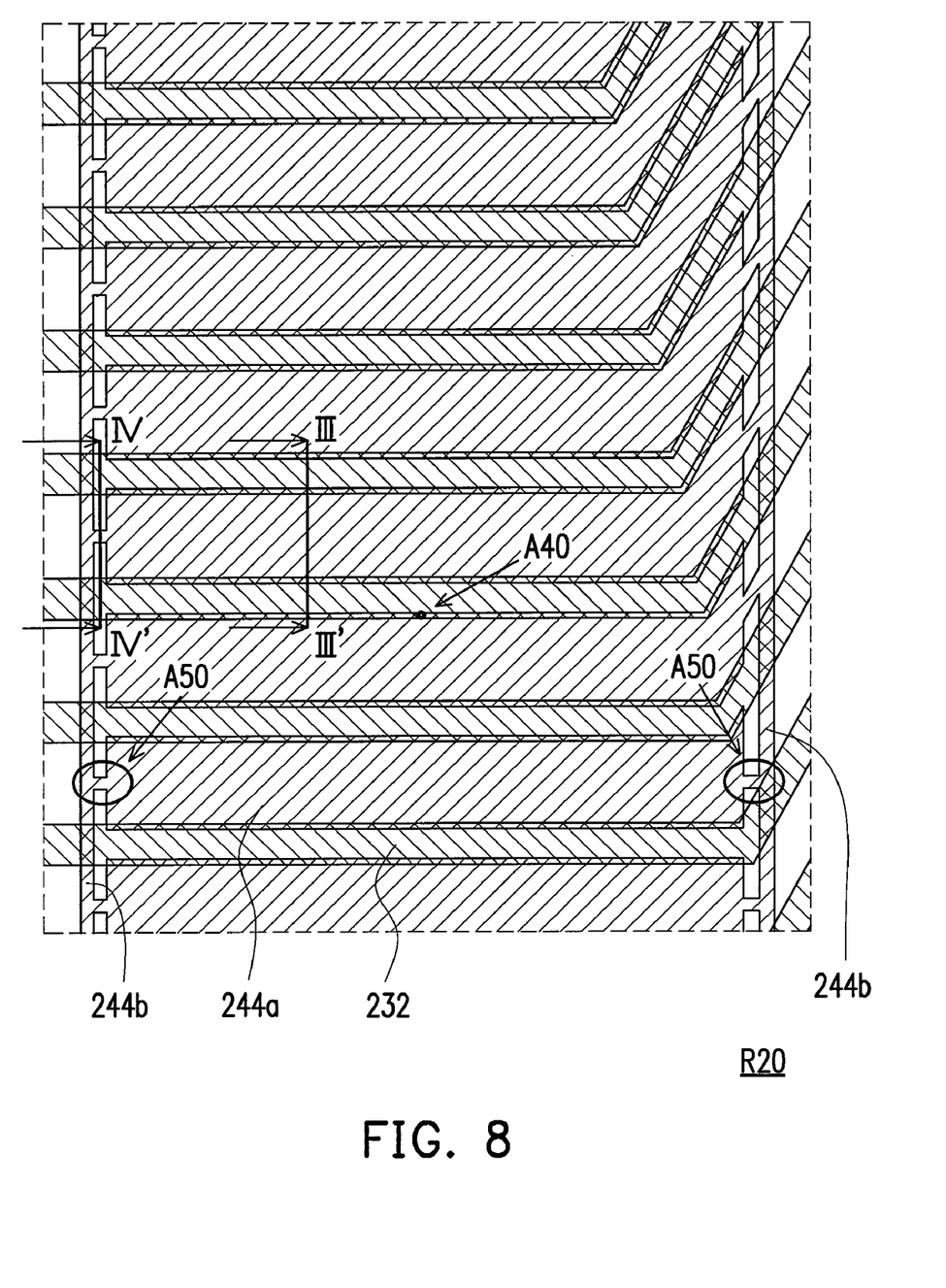
FIG. 8 shows an enlargement of an area R20 in FIG. 3.
Figure 9:
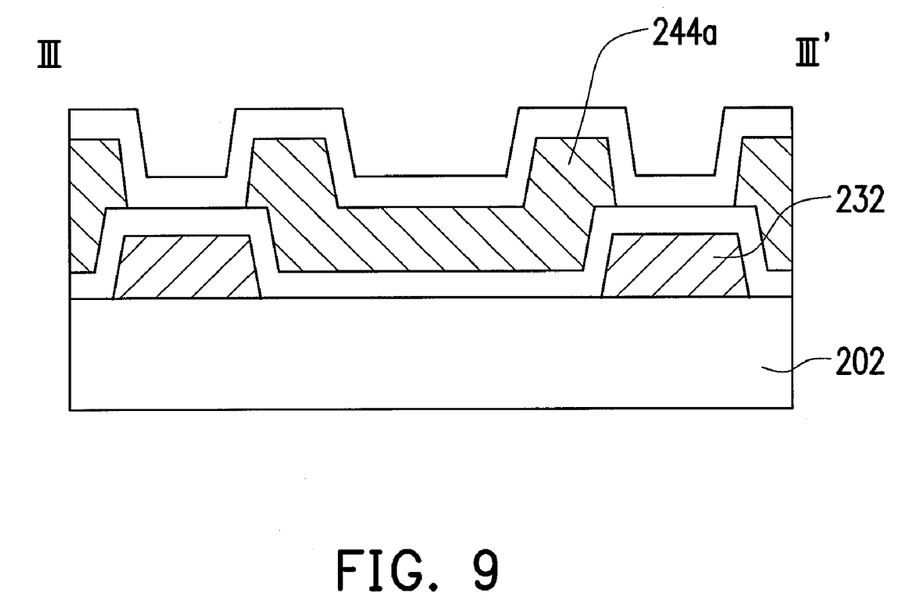
FIG. 9 and FIG. 10 show cross-sectional views taken along lines III-III' and IV-IV' of FIG. 8, respectively.
Figure 10:
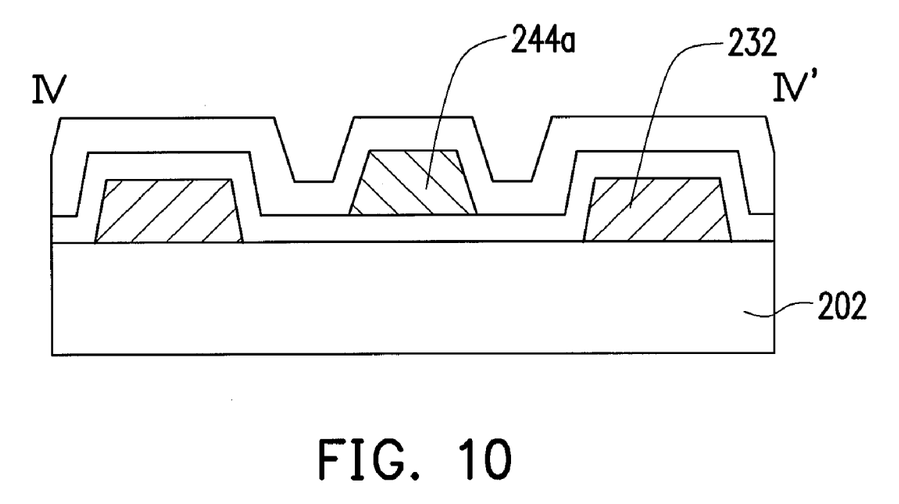

In the above exemplified discussion, the shield lines 242a are disposed between the source lines 234. Other shield lines are disposed between the gate lines 232. FIG. 8 shows an enlargement of an area R20 in FIG. 3. FIG. 9 and FIG. 10 show cross-sectional views taken along lines III-III' and IV-IV' of FIG. 8, respectively. Referring to FIG. 3 and FIG. 8, second shield lines 244a and at least a second connection line 244b (for example, two second connection lines in FIG. 8) are formed of the second metal. Referring to FIG. 8 and FIG. 9, for shielding light, each of the second shield lines 244a is disposed between two gate lines 232 for preventing light pass through the gaps between the gate lines 232. For prevention of light leakage, the second shield line 244a is partially overlapped with two adjacent gate lines 232. The terminals of the second shield lines 244a are electrically connected to the second connection line 244b.

The second connection line 244b is coupled to a voltage source (not shown) for coupling another predetermined voltage to the second shield lines 244a, to prevent signal interference between the gate lines 232. This voltage provides an electrical inspection of the TFT array for checking whether there are shorts between the gate lines 232 and the second shield lines 244a.

Shorts maybe occur at the overlap, for example, pointed by an arrow A40 in FIG. 8, between the gate lines 232 and the second shield lines 244a. Connections parts of the second shield lines 244a to the second connection lines 244b have smaller widths than gaps between adjacent gate lines 232. In other words, Connections parts of the second shield lines 244a are not overlapped with the gate lines 232, as shown in FIG. 8 and FIG. 10. Even there are shorts between the second shield lines 244a and the gate lines 232, because connections parts of the second shield lines 244a to the second connection lines 244b, marked by A50 of FIG. 8, have smaller widths and are not overlapped with the gate lines 232, shorts are repaired by cutting off by laser. By this, yield of the TFT array substrate 210 is improved.

As above, in the LCD module and the TFT array substrate of the present invention, the first and the second repair patterns made of different metal layers provide repair areas for repairing the first and the second lead lines. Thus, the first and the second lead lines are apt to transmitting signals to the TFT array correctly, and the LCD having the TFT array substrate has good displaying quality and high yield rate. Further, the shield lines made of first or second metal layer are disposed in the peripheral circuit region for preventing leakage of light. Besides, by providing predetermined voltages on the shield lines, the signal interference between gate/source lines is improved. Connections parts of the shield lines to connection lines are not overlapped with gate/source lines and have smaller widths. When shorts occur at the overlap between the gate/source lines and the shield lines, they are further repaired by cutting off by laser. Therefore, yields of the TFT array substrate and the LCD module are improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A thin film transistor (TFT) array substrate, comprising:
   a substrate, having a pixel region and a peripheral circuit region surrounding the pixel region, the peripheral circuit region having an outer area and an inner area, and the inner area being disposed between the pixel region and the outer area;
   a TFT array, disposed in the pixel region, the TFT array including a first conducting layer and a second conducting layer;
   a plurality of first lead lines, disposed in the peripheral circuit region, the first lead lines being formed of the first conducting layer;
   a plurality of second lead lines, disposed in the peripheral circuit region, the second lead lines formed of the second conducting layer; and a plurality of repair patterns, disposed in the inner area, wherein the repair patterns are sandwiched between the second lead lines and the substrate, and at least a pre-repair area is at a region where only one of the second lead lines and only one of the repair patterns are overlapped.

2. The TFT array substrate of claim 1, wherein the number of the repair patterns is substantially equal to the number of the second lead lines, and only one of the repair patterns is disposed under only one of the second lead lines.

* * * * *